United States Patent [19]

Galus et al.

[11] Patent Number: 4,504,233
[45] Date of Patent: Mar. 12, 1985

[54] HIGH PERFORMANCE CONTROL LOADING SYSTEM FOR MANUALLY-OPERABLE CONTROLS IN A VEHICLE SIMULATOR

[75] Inventors: Dean M. Galus, Endicott; Brian E. Sill, Binghamton, both of N.Y.

[73] Assignee: The Singer Company, Binghamton, N.Y.

[21] Appl. No.: 451,133

[22] Filed: Dec. 20, 1982

[51] Int. Cl.³ .............................................. G09B 9/08
[52] U.S. Cl. ..................................................... 434/45
[58] Field of Search ......................................... 434/45

[56] References Cited

U.S. PATENT DOCUMENTS

| | | | |
|---|---|---|---|
| 3,033,174 | 5/1962 | Hemstreet | 91/403 |
| 3,067,725 | 12/1962 | Hemstreet et al. | 91/447 |
| 3,903,614 | 9/1975 | Diamond et al. | 434/45 |
| 4,236,325 | 12/1980 | Hall et al. | 434/45 |
| 4,398,889 | 8/1983 | Lam et al. | 434/45 |

*Primary Examiner*—William H. Grieb
*Attorney, Agent, or Firm*—Douglas M. Clarkson

[57] ABSTRACT

The control loading system described is capable of higher performance than anything available heretofor because of certain described features built in. The control loading system that is described includes a force transducer to develop an electrical signal corresponding to the force applied to the manually-operable controls of a vehicle simulator to develop a "feel" as sensed by an operator that matches the real world response of actual controls. A computer generates an electrical signal corresponding to the force required for these controls to give these realistic cues. A compare circuit generates a signal corresponding to the difference between the applied force and the required force, and the usual actuator device develops a force on the manually-operable vehicle controls in response to this difference signal. One of the more significant features of the invention is the monitor which detects deviations in force magnitude to disable the control loading system when the force detected exceeds a pre-set limit.

36 Claims, 16 Drawing Figures

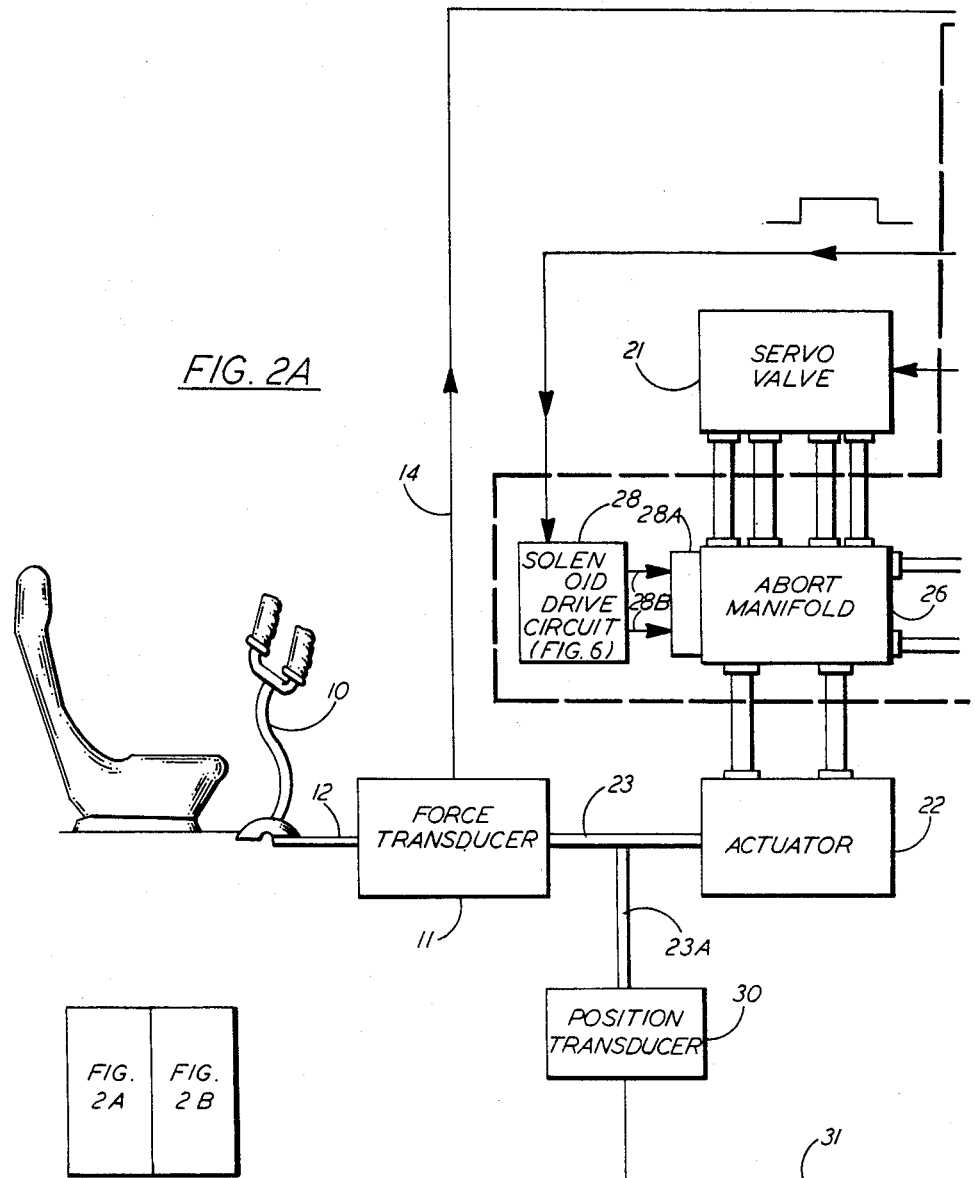

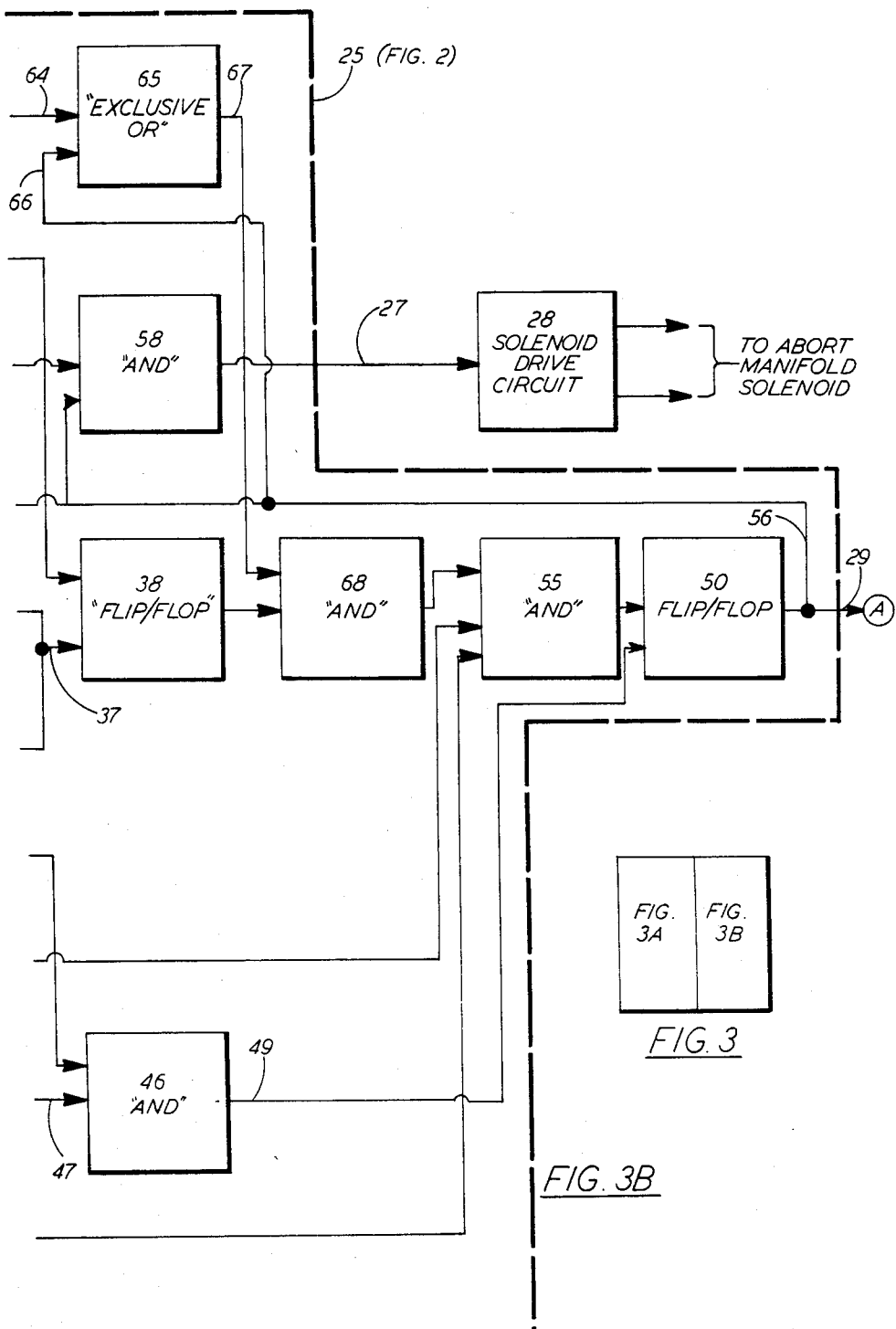

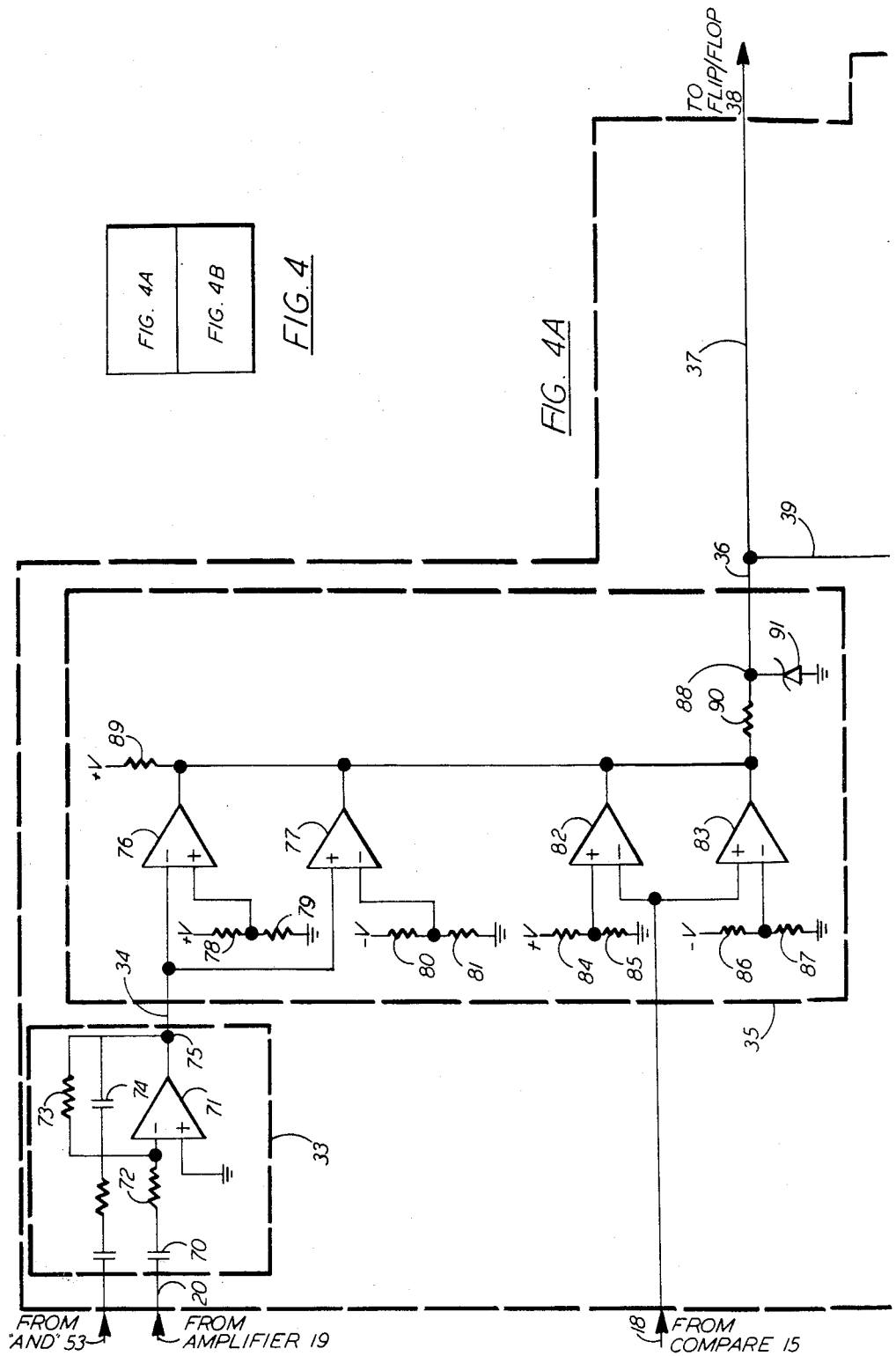

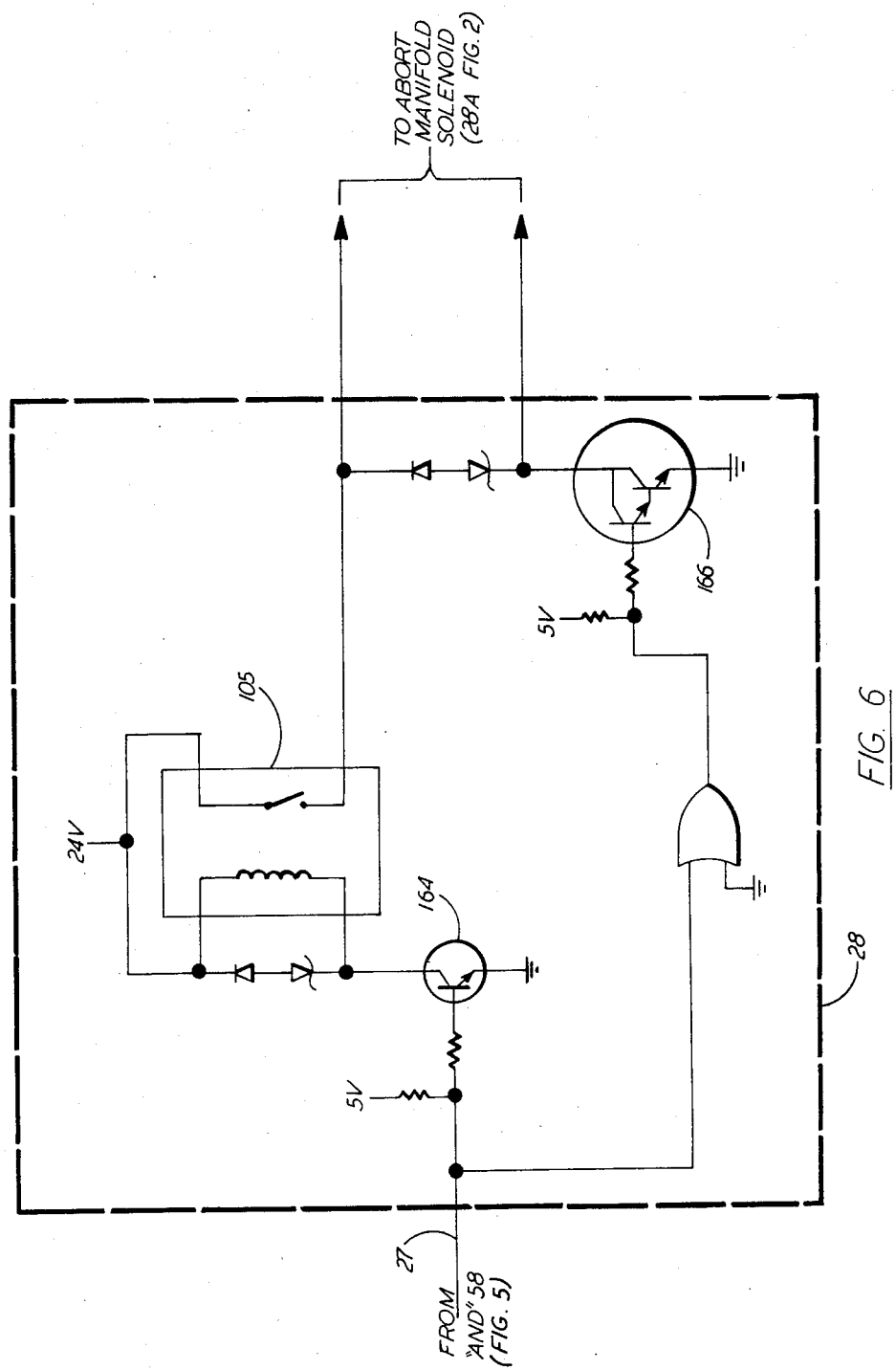

HIGH PERFORMANCE CONTROL LOADING SYSTEM FOR MANUALLY-OPERABLE CONTROLS IN A VEHICLE SIMULATOR

BACKGROUND OF THE INVENTION

1. Field of Invention

The field of art to which this invention relates includes, generally, that of simulator control loading systems and, more particularly, to an improved high performance system for developing realistic reaction forces in manually-operable controls in a vehicle simulator.

This invention is adapted particularly to hydraulic control loading systems for use with a vehicle simulator such as shown in the U.S. Pat. No. 4,236,325, issued Dec. 2, 1980, to John D. Hall et al. and assigned to the same assignee as the present invention.

2. Description of the Prior Art

Today, one of the best and most widely accepted ways of teaching pilots to fly is through the use of an aircraft simulator which permits the accumulation of flight experience without the high risk and the excessive cost that otherwise may be involved. To be a truly effective teaching instrument, however, the flight simulator must provide sensory cues that are realistic to the pilot trainee.

One important contributor to the realism of a simulator is the "feel" associated with the primary flight controls. Since aircraft control surfaces do not exist in a simulator, the forces associated with the surfaces must be produced by artificial means in order to create the necessary "feel" at the control.

Therefore, a system to "load" the control is required if the aircraft's control forces are to be duplicated. Many training judgments depend upon a pilot's response to these forces and to the "feel" of the controls.

For example, during flight operation of an actual aircraft, the pilot must control his ailerons, elevator and rudder to maneuver an aircraft. This control is maintained by a pilot's use of both hands and feet by holding on to a conventional control stick to control the elevator and the aileron systems while stepping on foot pedals to operate the rudder system.

To simulate these controls effectively, forces must be developed in the control stick and in the foot pedals to replace these missing forces. A pilot must "feel" not only these forces but also the effects of his actions as communicated to him through these forces applied to these controls.

As a pilot moves his control stick and adjusts the position of his foot pedals to maneuver his aircraft, he must feel resistance in his hand and his feet, simulating the actual resistance that a pilot flying an actual aircraft would feel. Here the requirement is not only for high performance on the part of the simulator control loading system but also for the capability of verification that the system is within certain specified standards of operation.

In addition, the quest for higher performance in this simulator control loading system has been accompanied by a trend in the industry to move away from subjective acceptability standards to those which have taken over in other areas in simulation; namely, the use of measurement and calibration systems which will ensure a close matching of the simulator control system force and position curves to those which are obtained in actual performance of operational aircraft.

Several different types of control loading systems have been developed in the past and some of these are currently in use in simulators today. Many of these systems employ force feedback techniques in order to produce electrical signals that are representative of the required control forces.

Typically, in a force feedback system, a computer is used to generate an electrical signal corresponding to the control force that is required for any given flight condition. This signal reflects the aerodynamic characteristics of the aircraft being simulated and the particular flight maneuver being performed.

In addition, an electrical signal representing the force exerted on the control by the pilot is generated. The pilot's force signal is fed back and compared with the required force signal. A signal corresponding to the difference between the required force and the pilot's force is generated to obtain proper loading of the control.

U.S. Pat. No. 4,236,325 teaches the use of a servo valve and a hydraulic actuator in combination to provide loading of simulator controls. A signal representing the difference between actual and required forces is used to drive a servo valve which, in turn, provides hydraulic oil flow to an actuator. The magnitude and the polarity of the driving signal determines the amount of hydraulic oil flow to each side of the actuator's piston.

A difference in the amount of hydraulic oil on opposing sides of the actuator's piston will cause the piston to move and exert a force on the piston rod. Therefore, by connecting the controls to the piston rod by appropriate mechanical linkage, the necessary force is transmitted to the controls.

During normal operation of some control loading systems suggested in the past, various forces are produced in order to obtain the proper "feel" in the controls. While some of these forces may be large enough to pose a threat to the safety of a pilot, they must be produced in this magnitude in order to simulate accurately the control's characteristics under certain flight conditions.

On the other hand, force levels above those that can be encountered in an actual aircraft must not be permitted to be transmitted to the controls in the simulator. Therefore, most of the control loading systems in the past do not develop these forces in a magnitude sufficient for obtaining the proper "feel" in these manually-operable controls.

There can be failures in either the hydraulic or the electrical means which make up the control loops to provide the "feel" to simulated aircraft controls. Where the failure is in the hydraulic system and where the electrical controls are still operative, additional electrically controlled elements can usually activate safety devices to protect equipment and personnel.

However, circumstances may conspire to prevent the electrical controls from functioning correctly, or a hydraulic failure may occur too rapidly for effective control by electrical means. For these reasons, most of the control loading systems in the past do not develop performance to the high level that is obtainable consistently and reliably by the present invention.

Among the prior art devices for dealing with this problem by providing hydraulic safety means are U.S. Pat. No. 3,033,174 and U.S. Pat. No. 3,067,725 both of which are in the name of Harold S. Hemstreet and both assigned to the same assignee as the present invention.

In the past, it has been suggested to use electrical controls attached to a servo valve with a relay to actuate the valve. The connection is such that the relay operates the valve in response to changes in electric current flow corresponding to certain changes in pressure which are indicative of hydraulic failure.

Such devices have proven unsatisfactory, however, since they respond only to very large changes in hydraulic pressure and introduce an undesireable time delay. If some of these prior art devices are operated at the high performance level that is needed in the simulator field, the system could be exposed to at least one violent shock before the safety device becomes operative.

Another prior art device proposes simple mechanical stops which are intended to absorb the force that is generated in excess to a desired or safe force. These stops are inadequate for many installations where space requirements are such that the mechanical stops can not be placed in a way to stop the undesired motion adequately. An example of such limited space is to be found in the cockpit space of aircraft simulators.

A pilot trainee is quite sensitive to shock and vibration in the control forces so that it is highly desireable and generally necessary to provide a better high frequency response in a flight simulator control loading system. Since striking a limit stop, for example, may create an audible knock, there are situations wherein such audible sounds detract substanstially from the realism sought to be obtained.

In modern grounded aircraft training systems, it is acknowledged that failthfulness of simulation is required for adequate training, particularly for training persons to operate present day aircraft of increasingly higher performance. It is acknowledged also that pilot familiarity with particular aircraft is based to a considerable degree upon recognition of both the static and the dynamic control forces which the pilot must apply to the aircraft controls in order to perform various maneuvers.

Shortcomings in the control loading systems included with a flight simulator may have an adverse effect upon the simulator flying qualities, with a result of material decrease in the validity of training. A control loading system must provide a force-generating system of considerable force capability which must have a realistically smooth "feel" and have extremely small friction, except for the small amount of friction present in an actual aircraft system. The generation of large hydraulic forces also have attendant risk of control unit damage through overloading or overheating.

Very small amounts of aileron or elevator friction can cause serious difficulty in maintaining an aircraft trimmed in flight, particularly at high speeds. When a control loading system is used as a part of an autopilot or other closed-loop control system, it is mandatory that the system meet certain dynamic requirements connected with the over all stability of the complete autopilot system.

Today's high standards of simulation require that the control loading unit be capable of generating non-linear force verses displacement curves, break-away forces or detent effects (corresponding to similar effects deliberately introduced into aircraft control systems), and limiting of stick travel as the result of limiting aerodynamic hinge movements or reduced hydraulic system capabilities during emergency operation.

In flight simulator control loading systems, it is necessary to generate forces on the manually-operable controls that are proportional, other factors, to such variables as control displacement, control trim positon, aerodynamic parameters, autopilot forces, etc. In artificial force-producing systems, a large variety of factors determine the magnitude of force in existence at a particular instance on the control.

Utilizing the present invention, the various nonlinearities and the rigid dynamic requirements for an aircraft flight simulator can be met without difficulty through electronic circuitry, as will be described in more detail presently. Thus, there has existed a long felt need for a means to detect conditions that are capable of producing unrealistic or incorrect forces at the manually-operable controls and to abort the control loading system before any incorrect force can be introduced to give the operator-pilot wrong information.

SUMMARY OF THE INVENTION

The invention includes a variety of features by means of which the desired control loading force is obtained under varying conditions of simulated flight. That many features of the invention are applicable to the simulation of vehicles other than aircraft will become apparent to those skilled in the art as the description proceeds.

Therefore, it is a principal object of the present invention to provided a control loading system of such high performance that devices to supplement a manually-operable control are unnecessary.

Another object of the present invention is to provide a means of detecting out-of-tolerance conditions within a control loading system and disabling the system when these conditions are detected.

Yet another object of this invention is to provide a control loading system adapted to test itself in order to verify that it is operating properly.

Briefly, a high performance control loading system constructed and arranged in accordance with the principles of the present invention will convey to manually-operable controls of a venicle simulator a "feel" that matches the real world response of actual controls. The system includes means to generate a signal corresponding to a difference between an applied force and a required force, means to generate a force in the manually-operable vehicle controls that is responsive to the difference signal, and a force monitor means to detect deviations inforce magnitude from the force responsive to this difference signal.

Other objects, advantages and uses of the invention will become apparent and will appear hereinafter as the present description proceeds.

Accordingly, the invention includes features of construction, combination of elements, and arrangement of parts, which will be exemplified in the constructions hereinafter described in detail, and the scope of the invention will be indicated by the claims appended hereto.

BRIEF DESCRIPTION OF THE DRAWINGS

For a fuller understanding of the nature and the objects of the invention, reference is made to the following detailed description taken in conjunction with the accompanying drawings, in which:

FIGS. 2, 2A and 2B are a block diagram of a presently preferred embodiment of a force feedback control loading system constructed and arranged in accordance with the present invention.

FIGS. 3, 3A and 3B are a block diagram of a presently preferred embodiment of a monitor circuit for use in connection with the circuit shown in FIG. 2.

FIGS. 4, 4A and 4B are a diagram of an "error" detector circuit in accordance with the invention.

FIGS. 5, 5A, 5B, 5C and 5D are a diagram of a self-test circuit and its interconnections with the "error" detector circuit shown in FIG. 4.

FIG. 6 is a diagram of a solenoid drive circuit in accordance with the invention.

DETAILED DESCRIPTION

Figure 1:
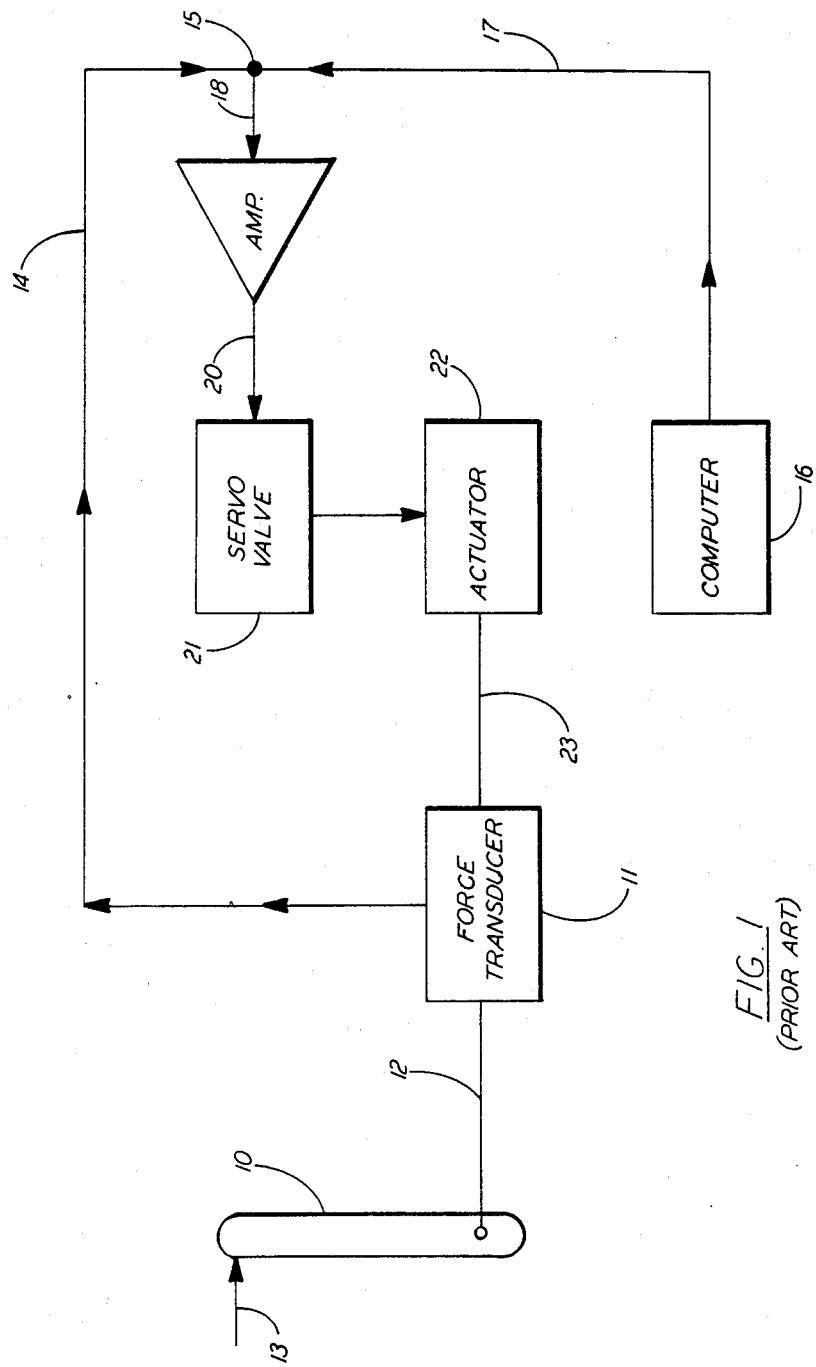
FIG. 1 is a block diagram of a force feedback control loading system used in aircraft simulators and over which the present invention provides substantial improvement.

Referred first to FIG. 1 of the drawings, a force feedback control loading system is shown in block diagram form to illustrate such a system as used in aircraft simulators today. In this system, a control stick 10 is used by a pilot trainee to perform the simulated flight maneuvers, and therefore, the control stick 10 must have a "feel" analogous to the control stick in an actual aircraft.

The proper resistance ("feel") at a control stick 10 for any given flight condition is produced in the following manner. The control stick 10 is connected to a force transducer 11 by a mechanical linkage 12. Therefore, any force 13 applied by the pilot trainee, not illustrated, is transmitted through the mechanical linkage 12 in order to apply a pushing or a pulling force on the force transducer 11.

The force transducer 11 converts any applied force 13 to an electrical signal which is carried by an electrical connection 14 to a junction 15. A computer 16 produces an electrical signal representative of the forces that would be present on the control surfaces of an aircraft due to the aircraft's dynamics during the maneuver being simulated.

Therefore, the computer 16 produces an electrical signal which is equal to the required force signal, which signal is carried over an electrical connection 17 to the same junction 15. With the electrical signal representative of the applied force arriving at the junction 15 over the connection 14 and the electrical signal representative of the required force arriving at the junction 15 over the connection 17, a signal is produced over a connection 18 which is representative of the difference between the required and the applied forces.

An amplifier 19 receives the difference signal over the connection 18 and produces a drive signal output over a connection 20 that commands a servo valve 21 to connect hydraulic oil under pressure to initiate operation of an actuator 22. The magnitude of the drive signal output from the amplifier 19 over the electrical connection 20 determines the amount of oil under pressure that is applied to each side of a piston (not shown) in the actuator 22.

A change in the amount of oil under pressure that is applied to each side of the piston in the actuator 22 will cause a movement of the piston that will exert a force through a mechanical linkage 23 to the force transducer 11. Since the force transducer 11 is connected also to the control stick 10 through the use of the mechanical linkage 12, any force developed by the actuator 22 is connected directly to the control stick 10.

In the absence of the applied force 13, the only forces acting on the control stick 10, therefore, correspond to the control surface forces resulting from the particular flight conditions. The computer 16 generates a signal representative of these forces, and this signal is connected to the junction 15 over the connection 17.

Since no applied force 13 is present, the difference signal developed over the connection 18 will be the required force signal. This signal will drive the servo valve 21 to produce the required force at the actuator 22. This force is transmitted through the linkage 23, the force transducer 11, and through the linkage 12 to the control stick 10. Thus, proper loading of the control stick 10 is provided.

When a force 13 is applied to the control stick 10, the force transducer 11 produces an electrical signal over the connection 14 that is representative of the difference in forces on the opposing sides of the force transducer 11, i.e., in the mechanical linkages 12 and 23, respectively. This electrical signal is connected to the junction 15 over the connection 14 where it is compared to the computer-generated force signal that is required for a given flight maneuver.

The signal on the connection 18 that corresponds to the difference between the required force and the force on the force transducer 11 is used to drive the servo valve 21. The servo valve 21 "commands" the actuator 22 to generate a force whose magnitude is the difference between the force 13 applied to the control stick 10 by the pilot and the required force generated by the computer 16.

Responsive to the "command" by the servo valve 21, the force developed by the actuator 22 is transmitted to the control stick 10 by the mechanical linkages 12 and 23, respectively. Therefore, the necessary force to simulate a given flight maneuver will be present at the control stick 10.

Figure 2B:
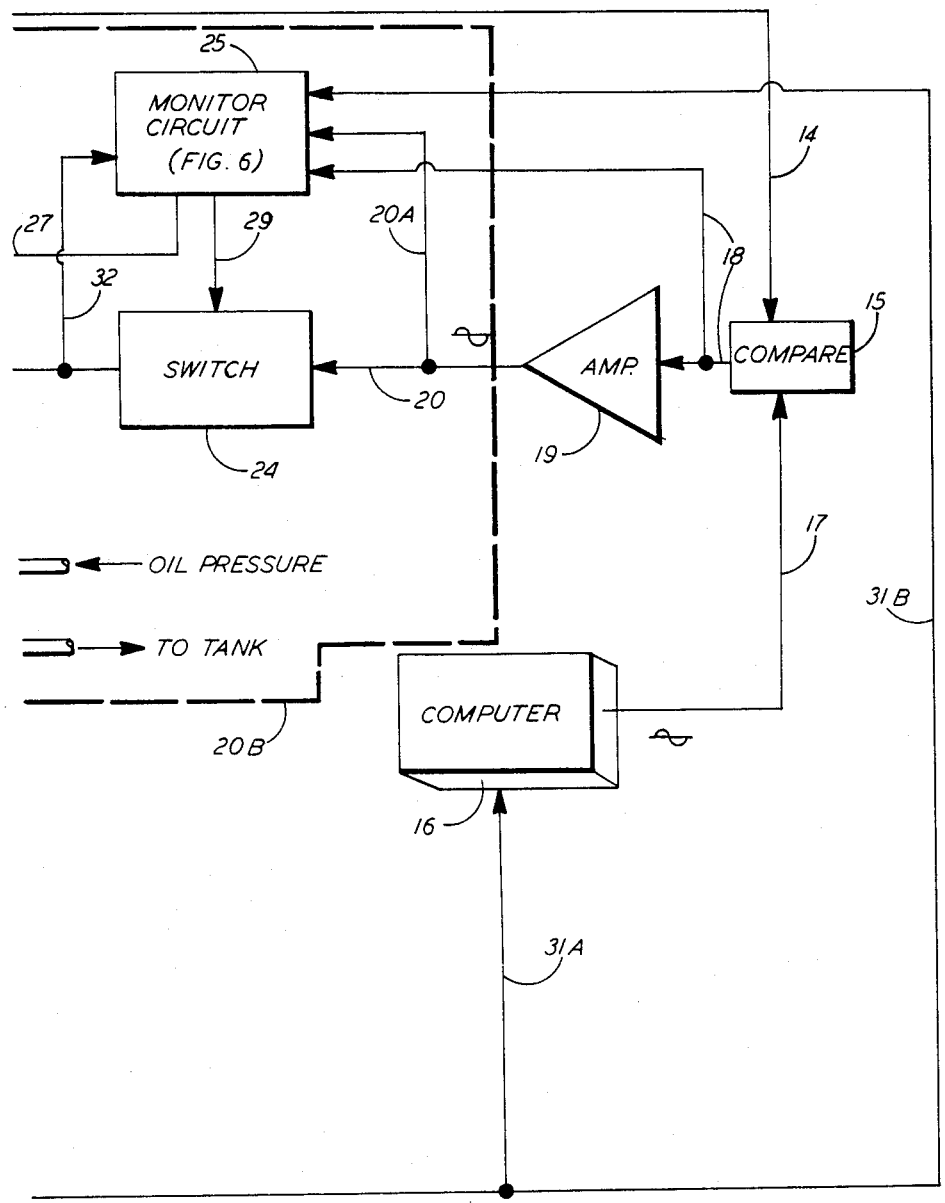

Referring now to FIG. 2 of the drawings, the presently preferred embodiment of the invention is shown in block diagram form to illustrate its respective component parts. The same reference numerals are used in the respective figures of the drawings to illustrate the same or comparable component parts.

Contrary to the prior art as shown in FIG. 1, a compare circuit at the junction 15 produces a signal output that is representative of the difference between the applied force and the required force. This difference signal output is connected over the connection 18 to, first, an amplifier circuit 19 in order to produce a drive signal for the servo valve 21 which generates the proper force in the actuator 22 and, second, a monitor circuit 25 which monitors the rate of change of the drive signal and the magnitude of the difference signal output.

The drive signal from the amplifier circuit 19 is connected to a switch 24 by a connection 20 and to the monitor circuit 25 by a connection 20A, instead of directly to the servo valve 21. The switch 24 is a normally-closed electrical switch that is controlled by the output of the monitor circuit 25.

The monitor circuit 25 monitors the rate of change of the drive signal from the amplifier circuit 19 and also the magnitude of the difference signal output from the compare circuit at the junction 15 and produces logic signal outputs, whose states depends upon the rate of change of the drive signal from the amplifier circuit 19 and the magnitude of the difference signal output. If the rate of change of the drive signal and the magnitude of the difference signal are not of sufficient level to cause excessive forces to be produced by the actuator 22, the logic signals output from the monitor circuit 25 will "command" the electrical switch 24 and an abort manifold 26 to assume their normal states. The output logic signals from the monitor circuit 25 are connected over a connection 27 to the abort manifold 26, and the output logic signals also are connected by means of a connection 29 to the electrical switch 24.

The electrical switch 24 is closed in its normal state, and therefore, the drive signal from the amplifier circuit 19 is connected directly to the servo valve 21. In addition, the abort manifold 26, in its normal state, allows hydraulic oil under pressure to flow to the actuator 22 as dictated by the servo valve 21.

On the other hand, when the monitor circuit 25 "senses" a rate of change of the drive signal from the amplifier circuit 19 or a magnitude of the difference signal output that is capable of creating excessive force levels at the control stick 10, the logic signals from the monitor circuit 25 will change state and, thereby, cause the electrical switch 24 to open and, also, will cause the abort manifold 26 to transfer to its abort mode. Therefore, the servo valve 21 is disconnected from the drive signal from the amplifier circuit 19 because of the opening of the electrical switch 24, and in addition to disconnecting the drive signal from the amplifier circuit 19, the electrical switch 24 will ground the input to the servo valve 21. This causes the servo valve 21 to return quickly to its null position.

In its abort mode, the abort manifold 26 connects the chambers on each side of the actuator's piston together and dumps the supply pressure to the return. Therefore, the electrical and the hydraulic drives have been removed from the system, and the excessive force that was commanded by the drive signal from the amplifier circuit 19 will not be produced.

The abort maniforld 26 can be of any type available commercially for rapid control of hydraulic oil under pressure. For example, a suitable abort manifold for the high performance control loading system of the present invention is available from Control Concepts, Inc. in Newton, Pa.

Such an abort manifold, as contemplated for use with the present invention, would be connected to be responsive to a solenoid drive circuit 28 (FIG. 2). The solenoid drive circuit 28 is connected to be responsive to logic signals from the monitor circuit 25 over the connection 27, and the solenoid drive circuit 28 is connected to a solenoid 28A, as part of the abort manifold 26, by a series of control lines 28B.

A signal that is indicative of the required force is generated by the computer 16 in response to information from a position transducer 30 that is connected by a mechanical linkage 23A to the mechanical linkage 23. The position transducer 30 produces an electrical signal that is representative of the position of the moveable piston (not shown) in the actuator 22.

An output connection 31 connects the electrical signal from the position transducer 30 to the computer 16 by a connection 31A and to the monitor circuit 25 by a connection 31B.

The preferred embodiment of this invention, as just described in detail in connection with FIG. 2 of the drawings, provides a means of adequately protecting the pilot trainee from dangerous forces that can be produced by the usual control loading system. However, such protection can not be provided unless the monitor circuit 25, the electrical switch 24 and the principal components within the broken line 20B are operating properly. Therefore, an arrangement in accordance with the present invention also provides a means for verifying the operating status of these components and for prohibiting initialization of the system when they are not operating properly.

Figure 3A:
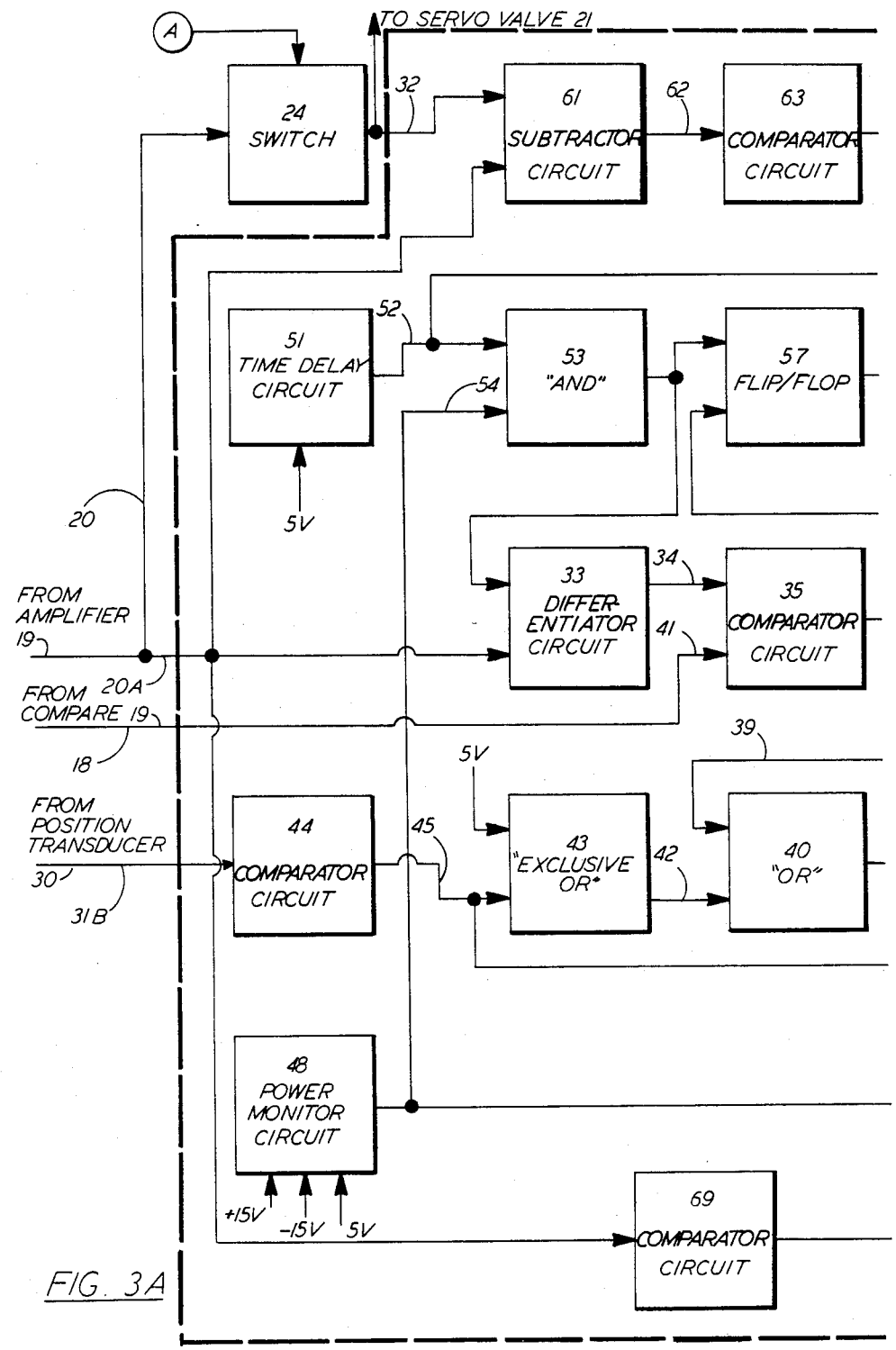

Referring now to FIG. 3 of the drawings, a block diagram shows the presently preferred embodiment of the monitor circuit 25 and how it interconnects with the electrical switch 24. The monitor circuit 25 monitors the output of the amplifier circuit 19 and the difference signal on the connection 18 in order to protect the pilot trainee from excessive force levels by removing the electrical and the hydraulic drive signals from the system when the rate of change of the output of the amplifier circuit 19 and/or the difference signal on the connection 18 exceeds a predetermined limit.

In FIG. 3, the connection 20 connects the output drive signal from the amplifier circuit 19 to a differentiator circuit 33 to produce the time rate of change signal over the connection 34. The time rate of change signal over the connection 34 then is compared to a specified predetermined acceptable limit in a comparator circuit 35. The difference signal over the connection 18 is also compared to its specified predetermined acceptable limit in the comparator circuit 35.

The output from the comparator circuit 35 is connect-to to a connection 36 which, in turn, is connected to an input connection 37 of a flip-flop 38 and to the input connection 39 of an "OR" gate 40. The output of the comparator circuit 35 will assume a "low" logic level when either or both of its inputs over the connections 34 and 41 exceed a predetermined limit.

The other input to the "OR" gate 40 is a signal over a connection 42 representing the position of the actuator piston relative to the position of the electrically simulated "stops" (electrical "stops" correspond to mechanical travel limits in the actual aircraft). This signal on the connection 42 is produced by an "EX-CLUSIVE OR" gate 43 and a comparator circuit 44, and its logic state is determined by the value of the position signal on the connection 31B with respect to the forward and aft "stop" position signals.

Specifically, the position signal on the connection 31B is compared to the "stop" position signals by the comparator circuit 44. A "low" level logic signal will be produced at the output of the comparator circuit 44 when the position signal on the connection 31B exceeds either one of the "stops" position signals. Therefore, a "low" signal at the output of the comparator circuit 44 signifies that the control is at a "stop", whereas a "high" signifies that the control is not at a "stop".

This signal on the connection 45 is then fed into the "EXCLUSIVE OR" gate 43. Because the other input to the gate 43 is tied to 5 volts, the signal produced by this gate is the inverse of signal 45.

The signal on 42 and the output of comparator circuit 35 are input to "OR" gate 40, and the output of gate 40 is then fed into "AND" gate 46. The second input to the "AND" gate 46 is a connection 47 to provide a signal representing the status of the power supplies used by the control loading system and will be a "low" level if one or more of these supplies are below a predetermined value. As previously stated, the output of the comparator circuit 35 will be a "low" logic signal when the time rate of change of the output of the amplifier 19 exceeds its acceptable limit and/or the difference signal on 18 exceeds its limit.

Therefore, the output of the "AND" gate 46 will be a "low" level if the output of the comparator circuit 35 is "low" level and the signal on 42 is a "low" level, and/or the output of the power monitor circuit 48 is a "low" level. This "low" at the output of "AND" 46 signifies an "error" is present within the system: The rate of change of the output of amplifier 19 exceeds its limit and/or the difference signal exceeds its limit and the control is not at a "stop", and/or one or more of the supply voltages are out of a predetermined tolerance.

On the other hand, if the control is at a "stop" (the signal on 42="high"), the output of the "OR" gate 40 will be a "high" level. Provided the power supplies are within their specified tolerances, the output of the "AND" gate 46 will also be "high".

Thus, the "high signal on the connection 42 serves to inhibit a "low" signal from the output of the comparator circuit 35 from reaching the "AND" gate 46 when the control is at an electrical "stop". This prevents the creation of a "low" ("error" present) signal at the output of the "AND" gate 46 which will result when the control "hits" an electrical "stop".

The output of the "AND" gate 46 is connected over a connection 49 to a flip-flop 50 which has been configured so its output is a "low" level when an "error" is present within the system (the signal or 49="low") and remains "low" until the "error" is corrected.

This "low" level signal at the output of the flip-flop 50 will activate the means used to remove the electrical and the hydraulic drive from the system. Therefore, the system of the present invention will be disabled any time an "error" is present within the system, and the pilot trainee will be protected from dangerous situations.

The pilot trainee can not be protected, however, if the "error" detection circuitry is not operating properly. Therefore, a self-test feature has been included.

The self-test is accomplished through the creation of a signal within the monitor circuit 25 that is capable of producing a rate of change signal at the output of differentiator circuit 33 that exceeds the specified limit set by comparator circuit 35 (an "error" condition), and monitoring of various signals to determine if the "error" was detected and whether proper actions were initiated.

If these actions do not occur, the control loading system can not be initialized. Since the test signal created by the monitor circuit 25 is generated when the control loading system power supplies are switched "on", the operating status of the monitor circuit 25 is verified before the system is allowed to initialize. Thus, the system can not be initialized unless the monitor circuit 25 is operating properly.

Still referring to FIG. 3 of the drawings, switching the control loading power supplies "on" causes a time delay circuit 51 to produce a signal output on a connection 52 representing a "low" logic level for a finite period of time, such as for example, approximately one second. Thereafter, the signal on the connection 52 switches to a "high" level.

The output signal from the time delay circuit 51 on the connection 52 is connected also to an "AND" gate 53. The other input to the "AND" gate 53 is over the connection 54 from the power monitor circuit 48, and the signal on connection 54 is a "low" if one or more of the power supplies are below a predetermined value.

Therefore, the output of the "AND" gate 53 will be a "low" logic level until the power supplies are all within tolerence and until the time delay signal from the time delay circuit 51 switches to a "high" logic level. Provided the power supplies are operating within tolerence, the output signal from the "AND" gate 53 will be a "low" to "high" transition approximately one second after power turn-on.

This transition from "low" to "high" will cause a maximum amplitude voltage spike at the output of the differentiator circuit 33 if the differentiator is functioning properly. This maximum amplitude voltage spike then should cause the output of the comparator circuit 35 to assume a "low" logic level due to the maximum amplitude voltage exceeding the specified predetermined limit. Thereafter, a "high" logic level is developed, because the voltage no longer exceeds the predetermined limit.

This "low" to "high" transition at the output of the comparator circuit 35 signifies that the differentiator circuit 33 and the comparator circuit 35 are functioning properly. Since the time delay output signal over the connection 52 serves to hold the output of the "AND" gate 53 "low" until after the power supplies have all reached their correct operating voltages, the "low" to "high" transition at the output of the comparator circuit 35 does indeed result from the "AND" gate 53 transitioning from "low" to "high" rather than the ambiguous operation of the differentiator circuit 33 and the comparator circuit 35 that can occur when the power is applied initially.

Therefore, the presence of a delayed "low" to "high" transition at the output of the comparator circuit 35 does indicate proper operation of the circuits 33 and 35. The output of the comparator circuit 35 then is connected into the flip-flop 38.

The flip-flop 38 serves as a latch to produce a "low" signal until the circuits 33 and 35 have been tested for proper operation. Therefore, if these circuits are not functioning properly, the output of the flip-flop circuit 38 will remain "low".

Obviously, this maintaining of the flip-flop 38 at a "low" logic level will produce a "low" logic level at the output of an "AND" gate 55. The flip-flop 50 needs to have a "low" to "high" transition from the "AND" gate 55 along with a "high" from the "AND" gate 46 in order to initialize the control loading system.

Upon an initial power-on, the "AND" gate 46 initially develops a signal at its output on the connection 49 that is a "low" logic level, because the power monitor signal 47 is "low" until the power supplies all reach their correct operating voltages. This "low" logic level from the "AND" gate 46 is latched by the flip-flop 50 until the output from the "AND" gate 46 goes to a "high" level and the other input to the flip-flop 50 switches from a "low" to a "high" level.

Consequently, the output of the flip-flop 50 will be at a "low" logic level just after the power-up situation occurs and will remain "low" if the circuits 33 and 35 are not functioning properly. Therefore, in this case, the control loading system can not be initialized.

At power-up, flip-flop 50 is also tested for proper operation. As previously specified, the output of flip-flop 50 will be a "low" level just after power-up. This output signal is fed along connection 56 to flip-flop 57 and "AND" gate 58. The other input to flip-flop 57 is the output of "AND" gate 53.

Flip-flop 57 is configured such that its output will go "low" when the output of "AND" gate 53 is "low", and will remain "low" until the output of "AND" gate 53 goes "high" and then the output from flip-flop 50 transitions "low" to "high". Thus, if flip-flop 50 is failed "high", the output of flip-flop 57 will go "low" at power-up, and will remain "low".

This occurs because the output of "AND" gate 53 is "low" for approximately one second after power-up, and this drives the output of flip-flop 57 "low". If flip-flop 50 is failed "high", a "low" to "high" transition will not be present at the input to flip-flop 57, and the output of flip-flop 57 will remain "low".

This will obviously create a "low" at the output of "AND" gate 58. This "low" is fed into the solenoid drive circuit 28, where it "commands" the abort manifold to assume its abort mode. Therefore, no hydraulic pressure will be applied, and the system will not be initialized.

In addition to testing the circuits 33 and 35 and the flip-flop 50 for proper operation, the electrical switch 24 is tested also. As stated previously in reference to this FIG. 3, the output signal from the flip-flop 50, over the connections 56 and 29, is at a "low" logic level upon an initial power-up and also any time an "error" is detected within the system.

A "low" logic level signal on the connection 29 is used to control the electrical switch 24 in order to create an open circuit between the amplifier circuit 19 and the servo valve 21 and, also, to ground the input to the servo valve 21. The self-test feature checks for proper operation of the electrical switch 24 and prohibits initialization of the control loading system if the electrical switch 24 is malfunctioning.

The operation of the electrical switch 24 is checked by comparing the difference in voltage across the switch 24. This is accomplished by subtracting the output of the electrical switch 24 from the input to the electrical switch 24 (the output from the amplifier circuit 19 as it appears on the connection 20). This is accomplished in a subtractor circuit 61.

The output from the subtractor circuit 61 is fed along a connection 62 to a comparator circuit 63, which compares this difference signal, over the connection 62, to approximately zero volts provided in the comparator circuit 63. The output from the comparator circuit 63 will be at a "low" logic level if the difference in voltage across the electrical switch 24 is approximately zero. This signifies that the electrical switch 24 is closed.

Conversely, a "high" logic level at the output connection 64 will signify that the electrical switch 24 is open. The signal, therefore, on the connection 64 (representing the status of the electrical switch 24) is connected to an "EXCLUSIVE OR" gate 65, the other input being on the connection 66 (which signal represents what the status of the electrical switch 24 should be: open or closed).

The output of the "EXCLUSIVE OR" gate 65, on a connection 67, will be a "high" logic level if the electrical switch 24 is operating properly, and the output on the connection 67 will be a "low" logic level if the electrical switch 24 is not operating properly. A "low" signal on the connection 67 will create a "low" logic level at the output of the "AND" gate 68, and likewise at the output of "AND" gate 55. As stated previously, the flip-flop circuit 50 requires a "low" to "high" transition in the logic levels from the "AND" gate 55 in order to initialize the control loading system, and this can not occur if the electrical switch 24 is not operating properly.

Alternatively, if the electrical switch 24 is operating properly, the "EXCLUSIVE OR" gate 65 will have an output signal on the connection 67 that is a "high" logic level. In addition, if the differentiator circuit 33 and the comparator circuit 35 are functioning properly, the output from the flip-flop circuit 38 will be a "high" logic level.

This "high" from the flip-flop 38 along with the "high" from the output of the "EXCLUSIVE OR" gate 65 will create a "high" at the output of the "AND" gate 68. The output of "AND" gate 68, along with the outputs from comparator circuits 44 and 69, is fed into "AND" gate 55. The output of the comparator circuit 44 represents the position of the control with respect to the electrical "stops", and is a "high" when the control is not at a "stop".

The output of the comparator circuit 69 represents the magnitude of the output of the amplifier circuit 19. If the magnitude of the output of the amplifier circuit 19 is greater than approximately zero volts, comparator circuit 69 will output a "low". Conversely, a "high" represents an output from the amplifier circuit 19 of approximately zero volts.

By moving the control throughout its operating range, a point can be found where the output of the amplifier circuit 19 is approximately zero volts. This will cause the output of the comparator circuit 69 to transition from "low" to "high". This transition will also be present at the output of the "AND" gate 55 as long as the differentiator circuit 33, the comparator circuit 35, and the switch 24 are operating properly (i.e., the output of the "AND" gate 68 is "high"), and the control is not at an electrical "stop".

This "low" to "high" transition along with a "high" from the "AND" gate 46 (signifying that no "error" is present within the system) will produce a "high" at the output of the flip-flop 50. This "high" will allow initialization of the system because the required conditions have been met: no "error" present, the safety system is operational, the control is not at a "stop", and the output of the amplifier circuit 19 has approached zero volts (requiring the output of the amplifier circuit 19 to be approximately zero volts before initialization can occur, prevents the system from comming-on forcefully).

Figure 4B:
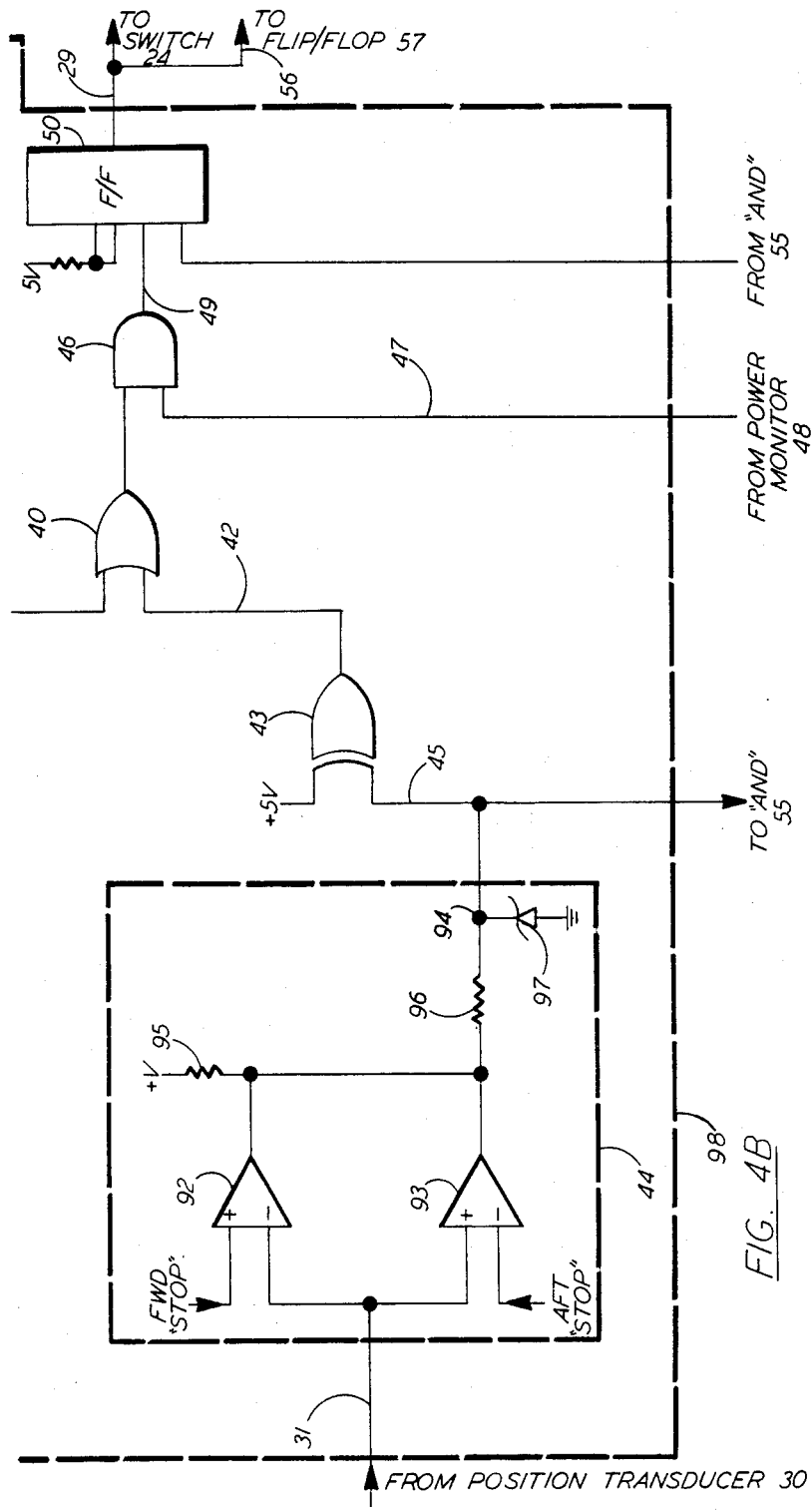

In view of the very positive contribution that these two features, that is, the "error" detection feature and the self-test feature, make to the high performance of a control loading system constructed and arranged in accordance with the principles of the present invention, more details of these two features are shown in FIG. 4 of the drawings.

Referring now to FIG. 4 of the drawings, the "error" detector feature is shown in more detail in this embodiment of of the invention as including the differentiator circuit 33, the comparator circuits 35 and 49, the "OR" gate 40, "EXCLUSIVE OR" gate 43, "AND" gate 46, and the flip-flop 50.

In the differentiator circuit 33, a capacitor 70 differentiates the output of the amplifier circuit 19 connected over the connection 20 and produces a time-rate-of-change of the signal on the connection 20 at the output of the amplifier 71 in FIG. 4. Two resistors 72 and 73, along with a capacitor 74 are included in this circuit for noise, scaling, and frequency roll-off considerations.

The time-rate-of-change signal that is developed by this circuit at a point 75 is connected by the connection 34 to the comparator circuit 35. Here, the individual comparators 76 and 77 compare the time-rate-of-change signal to predetermined positive and negative limits, the positive limit being preset by the values of resistors 78 and 79, respectively, and the negative limit being preset by resistors 80 and 81, respectively.

The comparator circuit 35 also utilizes the comparators 82 and 83 to compare the signal on 18 representing the difference in applied and required forces to predetermined positive and negative limits established by resistors 84 and 85, and 86 and 87, respectively. Comparators 76, 77, 82, and 83 are configured and connected in such a way that a "low" level logic signal will be created at point 88 if the time-rate-of change signal over connection 34 exceeds its predetermined limit and/or the difference signal on 18 exceeds its limit.

A "low" level logic signal at the point 88 signifies that an "error" is present within the control loading system. Two resistors 89 and 90, and a zener diode 91, serve to limit the voltage swing at the point 88 to transistor-to-transistor-logic levels, and it serves also to limit electrical current flow to the individual comparators 76, 77, 82, and 83. The logic signal at point 88 is fed via connection 37 to flip-flop 38, and over connection 39 to "OR" gate 40.

Comparator circuit 44 uses two comparators, 92 and 93, to determine the position of the control with respect to the position of the electrical "stops". Specifically, comparators 92 and 93 compare the position signal on 31 with the position of the forward and aft electrical "stops".

The comparators 92 and 93 are configured so that a "low" level logic signal will be produced at point 94 when the position signal on 31 exceeds either one of the "stops" position signals (i.e., the control is at a "stop"). Resistors 95 and 96, and zener diode 97, limit the voltage swing at point 94 to transistor-to-transistor-logic levels. The logic signal produced at point 94 is fed to "EXCLUSIVE OR" gate 43 and "AND" gate 55.

The "EXCLUSIVE OR" gate 43 serves to invert the logic signal present at point 94. Therefore, a "high" level signal at the output of gate 43 signifies that the control is at a "stop", whereas a "low" signifies that the control is not at a "stop". The output of the gate 43 is fed into the "OR" gate 40. The other input to the gate 40 is the output of the comparator circuit 35.

As previously specified, the output of the comparator circuit 35 will be a "low" level if there is an "error" within the system, and the output of the gate 43 will be "low" if the control is not at a "stop". COnsequently, the output of the gate 40 will be "low" only if there is an "error" within the system and the control is not at a "stop". This will obviously create a "low" signal at the output of the "AND" gate 46, which is then fed into the flip-flop 50.

The configuration of the flip-flop 50 is such that its output assumes a "low" logic level whenever a "low" signal is present at the output of the "AND" gate 46 (indicating: an "error" has been present and the control is not at a "stop"), and it remains "low" until the "error" has been corrected and the self-test conditions have been met. This "low" level logic signal is used to disable the control loading system by causing the electrical switch 24 to "open" and by causing the hydraulic abort manifold 26 to transfer to its abort mode whenever an "error" is present.

Figure 5:
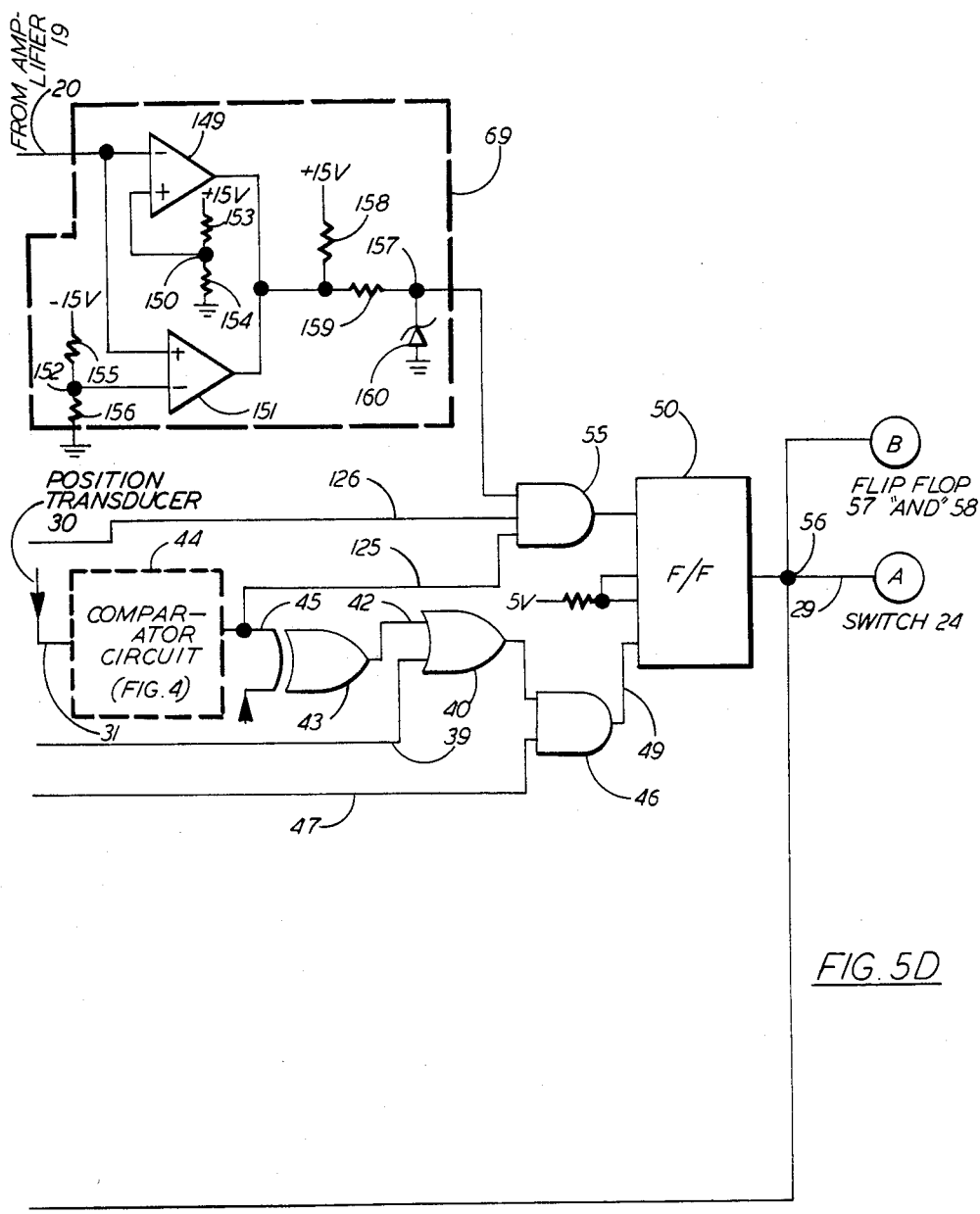
Figure 5:
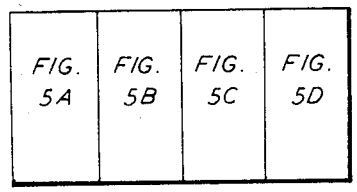
Figure 5A:
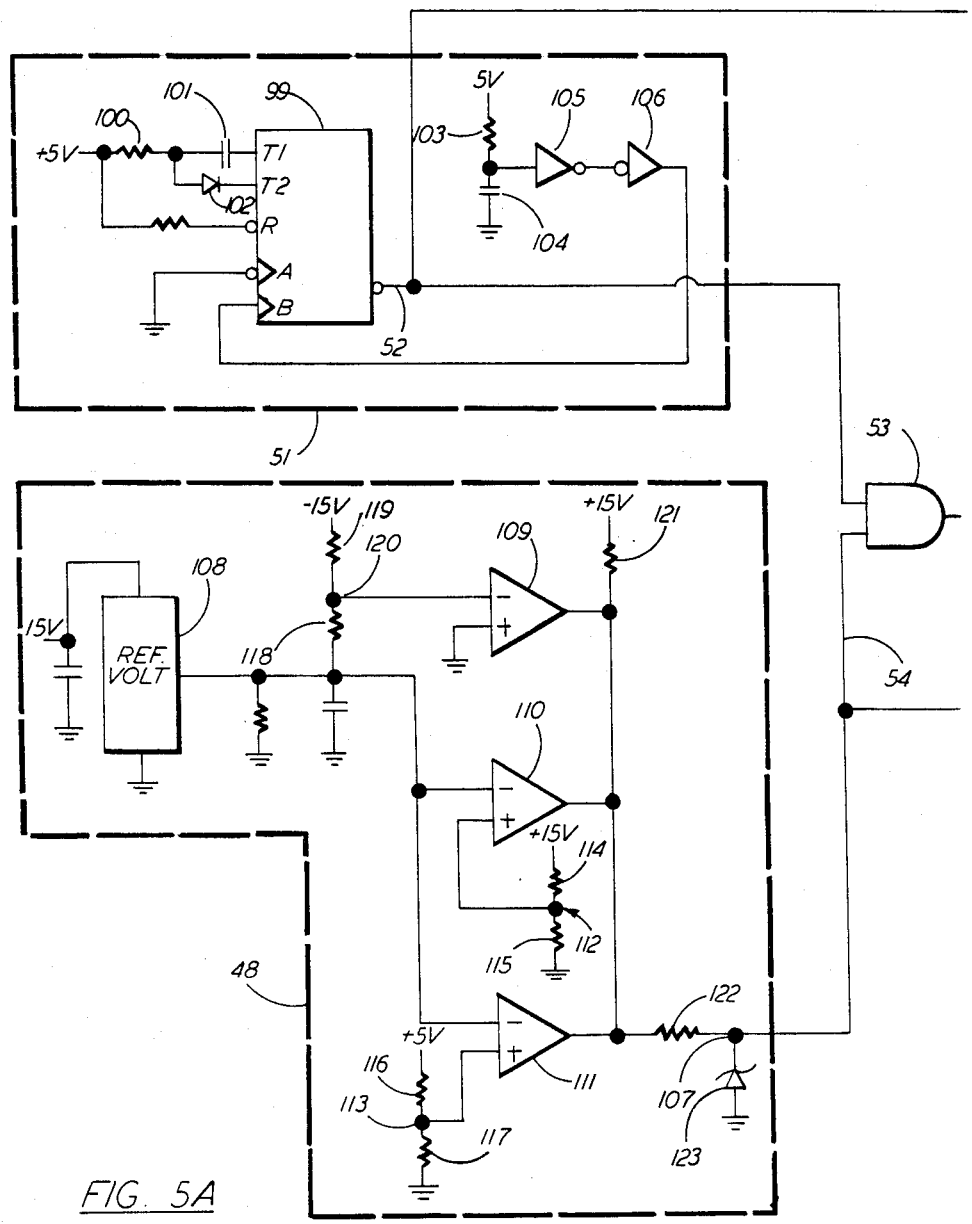
Figure 5B:
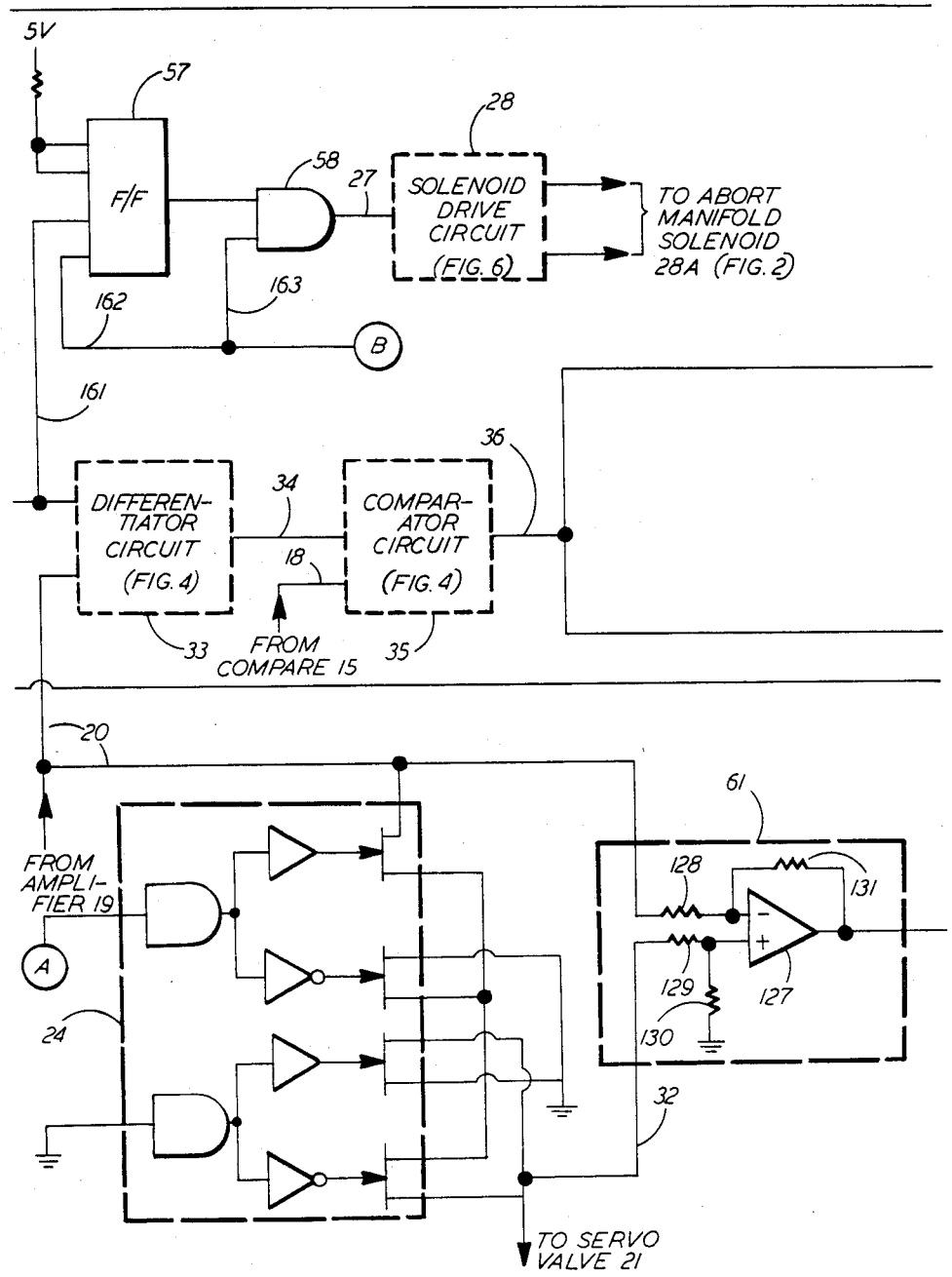
Figure 5C:
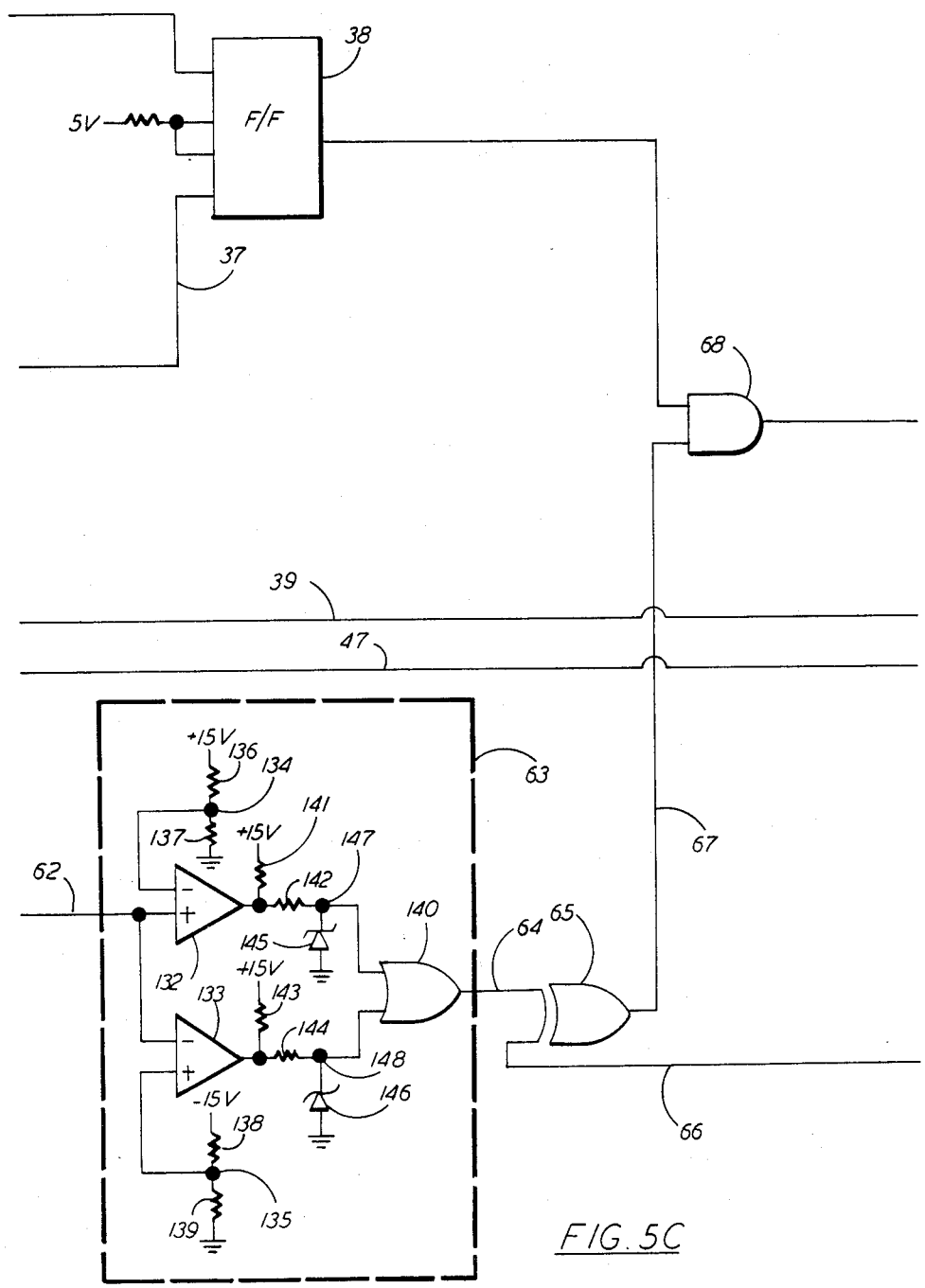

To explain in still further detail how the self-test feature of the present invention interacts with the "error" detector feature 98 just described in reference to FIG. 4, reference is now made to FIG. 5 of the drawings.

In FIG. 5, one component of the self-test feature of the present invention is provided by the time delay circuit 51. When the power supplies (there are several) to the control loading system of the opresent invention are switched "on", a "one-shot" monostable multivibrator circuit 99 will produce a signal on the connection 52 having a "low" logic level for a finite period of time, and then the signal on the connection 52 will switch automatically to a "high" logic level.

A resistor 100, a capacitor 101, and a diode 102 determine the period of time (approximately one second) that the signal on the connection 52 remains at a "low" logic level. A resistor 103 and a capacitor 104 in effect guarantee that the "one-shot" monostable multivibrator circuit 99 will produce a "low" to "high" transition at its output due to the capacitor 104 charging from a ground potential.

Two Schmitt triggers 105 and 106, respectively, serve as a means of producing clearly defined logic levels for use as an input to the "one-shot" monostable multivibrator circuit 99. The signal on the connection 52 at the output of the time delay circuit 51 is connected directly to the flip-flop 38 and also to the "AND" gate 53. The flip-flop 38 is configured such that its output will be at a "low" logic level when ever the signal on the connection 52 is also at a "low" logic level, and it will remain at this "low" logic level until the signal on the connection 52 has gone to a "high" logic level and the output of the comparator circuit 35 undergoes a "low" to "high" transition.

As described previously, a "low" to "high" transition at the output of the comparator circuit 35 approximately one second after the power supplies to the control loading system have been turned "on" signifies that the differentiator circuit 33 and comparator circuit 35 are functioning properly. The operating status of the circuits 33 and 35 is determined by a power monitor circuit 48, the time delay circuit 51, and the "AND" gate 53.

The power monitor circuit 48 monitors the respective power supplies, including the +15 v, −15 v and 5 v, used by the control loading system and produces a "low" level logic signal at a point 107 when one or more of the power supplies are below a predetermined operating voltage. This is accomplished by the use of a voltage reference source 108 and the respective comparators 109, 110, and 111.

The output of the voltage reference source 108 is compared to the voltage at the point 112 by the comparator 110, and the output of this voltage reference source 108 is compared to the voltage at a point 113 by a comparator circuit 111. The voltage at the point 112 is determined by two resistors 114 and 115, respectively, and the voltage present at the output of the +15 volt supply.

If the output of the +15 volt supply is below its acceptable operating value, the voltage at the point 113 will be less than the voltage from the voltage reference source 108, and this will produce a "low" logic level at the point 107. Similarly, if the output of the 5 volt supply is below is acceptable operating value, the voltage at the point 113, determined by two resistors 116 and 117, respectively, will be less than the reference voltage, and a "low" level logic signal will be produced at the point 107.

The voltage reference source 108 is used also in conjunction with the −15 volt supply and two resistors 118 and 119 to determine the voltage at a point 120. The voltage at the point 120 then is compared to the ground potential by the comparator 109, and a "low" level logic signal will be produced at the point 107 if the −15 volt supply is below its acceptable limit.

Two resistors 121 and 122 and a zener diode 123 serve to limit the voltage swing at the point 107 to transistor-to-transistor-logic levels and to limit the current flow to the comparators 109, 110 and 111. Therefore, the signal output for the power monitor circuit 48 over the connection 54 will be a "low" logic level until all of the power supplies are within their specific operating ranges.

At the moment of start up, when the power is first turned "on", properly operating power supplies in a typical situation will reach their operating values in a few milliseconds. Therefore, the signal on the connection 54 at the output of the power monitor circuit 48 will be at a "low" logic level for a few milliseconds and then switch automatically to a "high" logic level. Since the signal on the connection 54 will be at a "high" logic level before the signal on the connection 52 switches from its "low" to "high" level, the output of the "AND" gate 53 will switch from a "low" to "high" logic level due to the switching of the signal on the connection 52.

The switching of the "AND" gate 53 will cause the differentiator circuit 33 to produce a maximum amplitude voltage spike which, in turn, causes the comparator circuit 35 to switch from a "low" to "high" logic level (FIG. 4). This signifies that the circuits 33 and 35 are functioning properly.

The flip-flop 38 is configured so that its output will be a "low" logic level until the signal on the connection 52 is a "high" logic level and the output of the comparator circuit 35 goes through its transition from "low" to "high". Therefore, the output of the flip-flop 38 will be at a "low" logic level until the differentiator circuit 33 and comparator circuit 35 have been tested. This creates a "low" logic level at the output of the "AND" gate 68, which is connected to the "AND" gate 55 which in turn is connected to flip-flop 50.

At the moment just after the power has been turned "on", the signal on the connection 54 is "low" and causes a "low" level logic signal at the output of the "AND" gate 46. This "low" level logic signal drives the output of the flip-flop 50 to a "low" logic level.

The output of the flip-flop circuit 50 is held "low" until a signal on the connection 49 is at a "high" logic level and then the output of the "AND" gate 55 switches from a "low" to "high" logic level. Since the output of the "AND" gate 55 can only switch from a "low" to "high" logic level if the differentiator circuit 33, comparator circuit 35, and the electrical switch 24 are functioning properly, and the control is not at a "stop", the control loading system is disabled until proper operation of the circuits 33 and 35, and the switch 24 is verified.

The operation of the electrical switch 24 is verified by the subtractor circuit 61, the comparator circuit 63 and the "EXCLUSIVE OR" gate 65. At initial power turnon, the "low" logic level that is present at the output of the flip-flop 50 will "command" the electrical switch 24 to "open".

The subtractor circuit 61 utilizes an amplifier circuit 127 to create a signal on the output connection 62, which is representative of the difference in voltage at the input to, and at the output of, the electrical switch 24. Four resistors 128, 129, 130 and 131 are used for scaling purposes to produce the difference signal on the connection 62. The signal on the connection 62 is connected directly to two comparators 132 and 133, respectively.

The signal on the connection 62 is compared to the voltage at two points 134 and 135 by the two comparators 132 and 133 respectively. Two resistors 136 and 137 are used to create a value of approximately 0+ volts at the point 134; two resistors 138 and 139 are used to create approximately 0− volts at the point 135.

If the magnitude of the signal on the connection 62 is greater than approximately zero volts, a "high" logic level signal will be produced at the output of the "OR" gate 140; signifying that the electrical switch 24 is "open". Conversely, if the magnitude of the signal on the connection 62 is approximately zero volts, a "low" level logic signal will be produced at the output of the gate 140 signifying that the electrical switch is "closed".

Four resistors 141, 142, 143 and 144 and two zener diodes 145 and 146 serve to limit the voltage swings at the two points 147 and 148, respectively, to transistor-to-transistor-logic levels. The output of the gate 140 is connected to the input of the "EXCLUSIVE OR" gate 65. The other input of the "EXCLUSIVE OR" gate 65 is the output of the flip-flop 50.

The signal output of the flip-flop 50 controls the operation of the electrical switch 24, and therefore, it represents what the status of the electrical switch 24 should be. If the electrical switch is operating properly; that is, if it is "open" because it has been "commanded" to open by the "low" level logic signal at the output of the flip-flop 50, the output of the "EXCLUSIVE OR" gate 65 will be "high".

This "high" level logic signal at the output of the "EXCLUSIVE OR" gate 65 along with the "high" from the flip-flop 38 that signifies proper operation of the differentiator circuit 33 and the comparator circuit 35 will create a "high" at the output of "AND" gate 68. If the control is not at a "stop", the signal on the connection 125 will also be a "high" level. Thus, the output of the "AND" gate 55 will "follow" the output of the comparator circuit 69.

As previously stated, by moving the control throughout its operation range, a position can be found where the output of the amplifier circuit 19 approaches zero volts. This will cause the output of the comparator circuit 69 to transition from a "low" to a "high" level. The comparator circuit 69 utilizes two comparators to determine the magnitude of the output of amplifier circuit 19.

Comparator 149 compares the output of the amplifier 19 to the voltage at point 150. Likewise, the comparator 151 compares the output of the amplifier 19 to the voltage at a point 152. The voltages at the points 150 and 152 are determined by the resistors 153, 154, 155, and 156, and correspond the 0+ volts and 0− volts respectively.

These two comparators 149 and 151 have been configured such that a "low" level signal will be produced at the point 157 if the output of the amplifier 19 is greater than approximately zero volts, and a "high" will be produced if the output of amplifier 19 is approximately zero volts. Resistors 158 and 159, and zener diode 160, servo to limit the voltage swing at point 157 to transistor-to-transistor-logic levels.

Since the output of the "AND" gate 55 will "follow" the output of the comparator circuit 69 if the switch 24 and the circuits 33 and 35 are operating properly, and the control is not at a "stop", a "low" to "high" transition can be produced at the output of the "AND" gate 55 by moving the control to the position where the output of the amplifier circuit 19 is approximately zero volts. Provided that there is no "error" present within the control loading system; that is, the signal on the connection 49 is a "high" logic level, this transition will cause the output of the flip-flop 50 to go to a "high" logic level. This "high" level signal will "command" the switch 24 to close, and this will allow the output of the amplifier circuit 19 to drive the servo valve 21. In addition to controlling the operation of the switch 24, the output of the flip-flop 50 is also used to control the solenoid of the abort manifold 26, thereby controlling whether the manifold is in its normal or its abort mode.

The output of the flip-flop 50 is fed to the flip-flop 57 and to the "AND" gate 58 in order to test the status of the flip-flop 50 before allowing the abort manifold 26 to transfer to its normal mode and introduce hydraulic pressure to the actuator 22. As indicated earlier, initial application of power will cause the output of the "AND" gate 53 to be a "low" level for approximately one second and then switch to a "high" level.

This "low" that is initially present at the output of the "AND" gate 53 will drive the output of the flip-flop 57 to a "low" level. This will create a "low" at the output of the "AND" gate 58, and this will "command" the abort manifold 26 to remain in its abort mode.

Flip-flop 57 is configured so that a "low" signal input over the connection 161 will drive the flip-flop output "low". The output will remain "low" until the input over the connection 161 goes to a "high" level and the input over the connection 162 transitions from a "low" to "high". Therefore, if the flip-flop 50 is failed to a "low" or "high" state, the necessary "transition" over the connection 162 will not be possible, and the output of the flip-flp 57 will remain "low". The "low" at the output of the flip-flop 57 will create a "low" at the output of the "AND" gate 58, which is fed into the solenoid drive circuit 28.

Referring now to FIG. 6, a "low" from the "AND" gate 58 will cause the two transistors 164 and 166 to remain off. Thus, the relay 164 will be de-energized, and the 24 volts will not be applied to the abort manifold solenoid 28A. Therefore, even if the transistor 164 or the relay 165 is malfunctioning in such a way that the 24 volts is applied to one of the solenoid's input terminals, the necessary ground is not applied to the other input terminal because the transistor 166 is off. Consequently, the solenoid 28A remains de-energized, and the manifold 26 remains in the abort mode.

On the other hand, if the flip-flop 50 is operating correctly, and all of the other initialization requirements have been met, a "low" to "high" transition will be present at the connection 162 of FIG. 5. This transition along with a "high" at the connection 161 will produce a "high" at the output of the "AND" gate 58.

The "high" at the output of the gate 58 will energize the solenoid 28A and the manifold 26 will transfer to its normal state, and the system will be operational. Hereafter, an "error" condition will produce a "low" at the output of the flip-flop 50; this will produce a "low" at the output of the "AND" gate 58, and the abort manifold will transfer to its abort mode.

In view of the preceding detailed description, it may be understood now by one skilled in this art that the present invention provides a technique that can be manufactured as a separate article of manufacture for attaching to the prior art systems, in an appropriate situation. For example, the component parts that are enclosed within the broken line 20B can be assembled and interconnected with suitable terminals and other connectors so that, as a separate article of manufacture, it can be coupled to a prior art control loading system as a retrofit to achieve a substantial improvement in its performance characteristics.

This invention has been described in terms of a control loading system as used in an aircraft simulator and in terms of a pilot trainee's control stick. However, it will be apparent readily to those skilled in the art that this invention can be practiced in any simulation condition where a control loading feedback loop is either desirable or is required.

It will be apparent also to those skilled in the art that various changes and modifications may be made without departing from the spirit of the invention. For example, an accelerometer could be coupled to the mechanical linkage in order to sense the linkage acceleration. Also other electronic differentiating circuits could be employed readily. This invention, therefore, is intended to cover all other changes and modification as defined by the claims appended hereto.

We claim:

1. A high performance control loading system for conveying to manually-operable controls of a vehicle simulator a "feel" sensed by an operator of the vehicle simulator that matches the real world response of actual controls, comprising:

force transducer means to develop an electrical signal corresponding to the force applied to said manually-operable controls by said operator of said vehicle simulator;

computer means to generate an electrical signal corresponding to the force required for said manually-operable controls to give realistic sensory cues to said operator;

said electrical signal generated by said computer means includes components representative of characteristics of the vehicle being simulated and the particular maneuver being performed;

means to compare said signal corresponding to the applied force with said signal corresponding to the required force and to provide an electrical signal corresponding to the difference;

actuator means including means to develop, on said manually-operable vehicle controls, a force responsive to said difference electrical signal to give the sensory cue of actual controls in an actual vehicle, and monitor means to detect deviations in force magnitude from said force responsive to said difference electrical signal and to disable the control loading system when said force magnitude exceeds a preset limit.

2. A high performance control loading system as set forth in claim 1 wherein said actuator means is in the form of a mechanical device that is operable responsive to hydraulic pressure, and mechanical linkage means to connect both said acturator means and said manually-operable controls with said force transducer means to develop said force on said manually-operable controls responsive to said difference electrical signal.

3. A high performance control loading system as set forth in claim 1 including electrically operable servo valve means connected to control the operation of said actuator means in response to said electrical signal corresponding to the difference between said applied force and said required force.

4. A high performance control loading system as set forth in claim 3 including amplifier means to amplify said difference electrical signal a predetermined amount before connection to operate said electrically operable servo valve means.

5. A high performance control loading system as set forth in claim 1 wherein said monitor means includes means to interrupt said difference electrical signal, thereby preventing said actuator means from developing said force on said manually-operable controls.

6. A high performance control loading system as set forth in claim 5 wherein said means to interrupt includes electrical switch means.

7. A high performance control loading system as set forth in claim 6 including amplifier means to amplify said difference electrical signal a predetermined amount before connection to said electrical switch means.

8. A high performance control loading system as set forth in claim 3 wherein said means to disable the control loading system includes an abort manifold device connected intermediate said actuator means and said electrically operable servo valve means.

9. A high performance control loading system as set forth in claim 8 wherein said electrically operable servo valve means operating said actuator means thru said abort manifold device develops said force on said manually-operable controls through the controlled manipulation of pressure in hydraulic fluid lines.

10. A high performance control loading system as set forth in claim 8 including amplifier means to amplify said difference electrical signal a predetermined amount, means to connect said amplifier means to both said servo valve means and to said abort manifold device.

11. A high performance control loading system for conveying to manually-operable controls of a vehicle simulator a "feel" sensed by an operator of the vehicle simulator that matches the real world response of actual controls, comprising:
    force transducer means to develop an electrical signal corresponding to the force applied to said manually-operable controls by said operator of said vehicle simulator;
    computer means to generate an electrical signal corresponding to the force required for said manually-operable controls to give realistic sensory cues to said operator;
    said electrical signal generated by said computer means includes components representative of characteristics of the vehicle being simulated and the particular maneuver being performed;
    means to compare said signal corresponding to the applied force with said signal corresponding to the required force and to provide an electrical signal corresponding to the difference;
    amplifier means to amplify said difference electrical signal a predetermined amount to produce a drive signal with a magnitude representative of said difference electrical signal;
    a normally closed electrical switch means connected to receive said drive signal produced by said amplifier means;
    monitor circuit means connected in parallel with said normally closed electrical switch means, to receive said drive signal also, to monitor the rate of change of said drive signal, and to produce a logic signal output the state of which is indicative of the rate of change of of said drive signal;
    electrically operable servo valve means to control the flow of a hydraulic fluid in the development of said required force in accordance with the magnitude of said drive signal, and
    actuator means including means to develop a force determined by the hydraulic fluid pressure as controlled by said servo valve means,
    whereby said normally closed electrical switch means is opened when said drive signal is detected to have reached a predetermined rate of change.

12. A high performance control loading system as set forth in claim 11 including means to connect said difference electrical signal to operate said electrically operable servo valve means.

13. A high performance control loading system as set forth in claim 12 including linkage means to connect said actuator means to said manually-operable controls of said vehicle simulator to develop said force on said manually-operable controls in response to said drive signal.

14. A high performance control loading system as set forth in claim 13 wherein said linkage means connects said actuator means and said force transducer means to said manually-operable controls of said vehicle simulator.

15. A high performance control loading system as set forth in claim 11 wherein said means to disable the control loading system includes an abort manifold device connected for control by said servo valve means and connected to be responsive to said logic signal produced by said monitor circuit means.

16. A high performance control loading system as set forth in claim 11 wherein said force transducer means develops also an electrical signal that is representative of a difference between the force applied by said operator and the force developed by said actuator means.

17. A high performance control loading system as set forth in claim 11 wherein said monitor circuit means includes differentiator circuit means and comparator circuit means.

18. A high performance control loading system as set forth in claim 17 wherein said differentiator circuit means includes connection means to receive the signal output of said amplifier means.

19. A high performance control loading system as set forth in claim 18 wherein said differentiator circuit means is adapted to produce a signal representative of the time rate of change of said signal output of said amplifier means.

20. A high performance control loading system as set forth in claim 17 wherein said comparator circuit means is adapted to compare the signal output of said differentiator circuit means to a predetermined value.

21. A high performance control loading system as set forth in claim 20 wherein the output signal from said comparator circuit means is a logic level signal having one of two predetermined values.

22. A high performance control loading servo system for conveying to manually-operable controls of a vehicle simulator a "feel" sensed by an operator of the vehicle simulator that matches the real world response of actual controls, comprising:
    force transducer means to develop an electrical signal corresponding to the force applied to said manually-operable controls by said operator of said vehicle simulator;

computer means to generate an electrical signal corresponding to the force required for said manually-operable controls to give realistic sensory cues to said operator;

said electrical signal generated by said computer means includes components representative of characteristics of the vehicle being simulated and the particular maneuver being performed;

means to compare said signal corresponding to the applied force with said signal corresponding to the required force and to provide an electrical signal corresponding to the difference;

actuator means including means to develop, on said manually-operable vehicle controls, a force responsive to said difference electrical signal to give the sensory cue of actual controls in an actual vehicle;

monitor circuit means to detect deviations in force magnitude from said force responsive to said difference electrical signal and to disable the control loading system when said force magnitude exceeds a pre-set limit; and self-test means to check predetermined ones of the component parts of said control loading system for proper operation to protect said operator from possible physical injury when the control loading forces exceed predetermined limits.

23. A high performance control loading system as set forth in claim 22 including power monitor means to test all power supplies to ensure that pre-selected component parts are not inoperative because a power source deviates from predetermined values.

24. A high performance control loading system as set forth in claim 23 wherein said force monitor means includes a second input connection from the output of said power monitor means.

25. A high performance control loading system as set forth in claim 24 including time delay means to prevent an enabling signal from said power monitor means from being connected to said force monitor means at initial start-up until after a pre-set time delay in order to hold the control loading system inoperative until all power supplies are at their operating values.

26. A high performance control loading system as set forth in claim 25 wherein said time delay means includes a plurality of Schmitt trigger circuits.

27. A high performance control loading system as set forth in claim 22 wherein said force monitor means includes electrical switch means to interrupt said difference electrical signal when said self-test means indicates a predetermined condition exists that can cause the control loading forces to exceed predetermined limits.

28. A high performance control loading system as set forth in claim 27 wherein said self-test means includes means to test said electrical switch means for proper operability.

29. A high performance control loading system as set forth in claim 27 including subtractor circuit means to produce a signal indicative of the difference in voltage across said electrical switch means, and comparator circuit means to produce a disabling signal when said difference in voltage is other than approximately zero.

30. A high performance control loading system as set forth in claim 27 including an abort manifold device connected to control the operation of said actuator means when a predetermined condition arises that could result in said physical injury to said operator.

31. A high performance control loading system as set forth in claim 29 wherein said subtractor circuit means includes amplifier means and resistor network means to produce said signal indicative of the difference in voltage across said electrical switch means.

32. A high performance control loading system as set forth in claim 29 wherein said comparator circuit means includes at least two separate comparators, each coupled to a network of resistors and zener diodes to produce a preselected logic signal output.

33. A high performance control loading system as set forth in claim 31 including mechanical linkage means to connect said actuator means and said force transducer means to said manually-operable controls.

34. A high performance control loading system as set forth in claim 33 wherein hydraulic oil under pressure is the operating medium between said actuator means and an electrically operable servo valve means.

35. An article of manufacture to function as a safety system for a high performance control loading system for conveying to manually-operable controls of a vehicle simulator a "feel" sensed by an operator of the vehicle simulator that matches the real world response of actual controls, comprising:

electrical switch means including connections for controlling an electrical operating current in response to a control signal;

monitor circuit means including a plurality of input connections for receiving a plurality of signals from which to detect deviations in force magnitude from a pre-set limit, and for generating said control signal; and abort manifold means including input and output hydraulic fluid connections so that hydraulic fluid under pressure can be interrupted responsive also to said control signal.

36. An article of manufacture as set forth in claim 35 including separate solenoid drive circuit means for controlling the operation of said abort manifold means responsive to said control signal.

* * * * *